Nov. 10, 1931.    R. H. JOHNSON ET AL    1,830,761
WHEELED HARROW
Original Filed Aug. 30, 1926
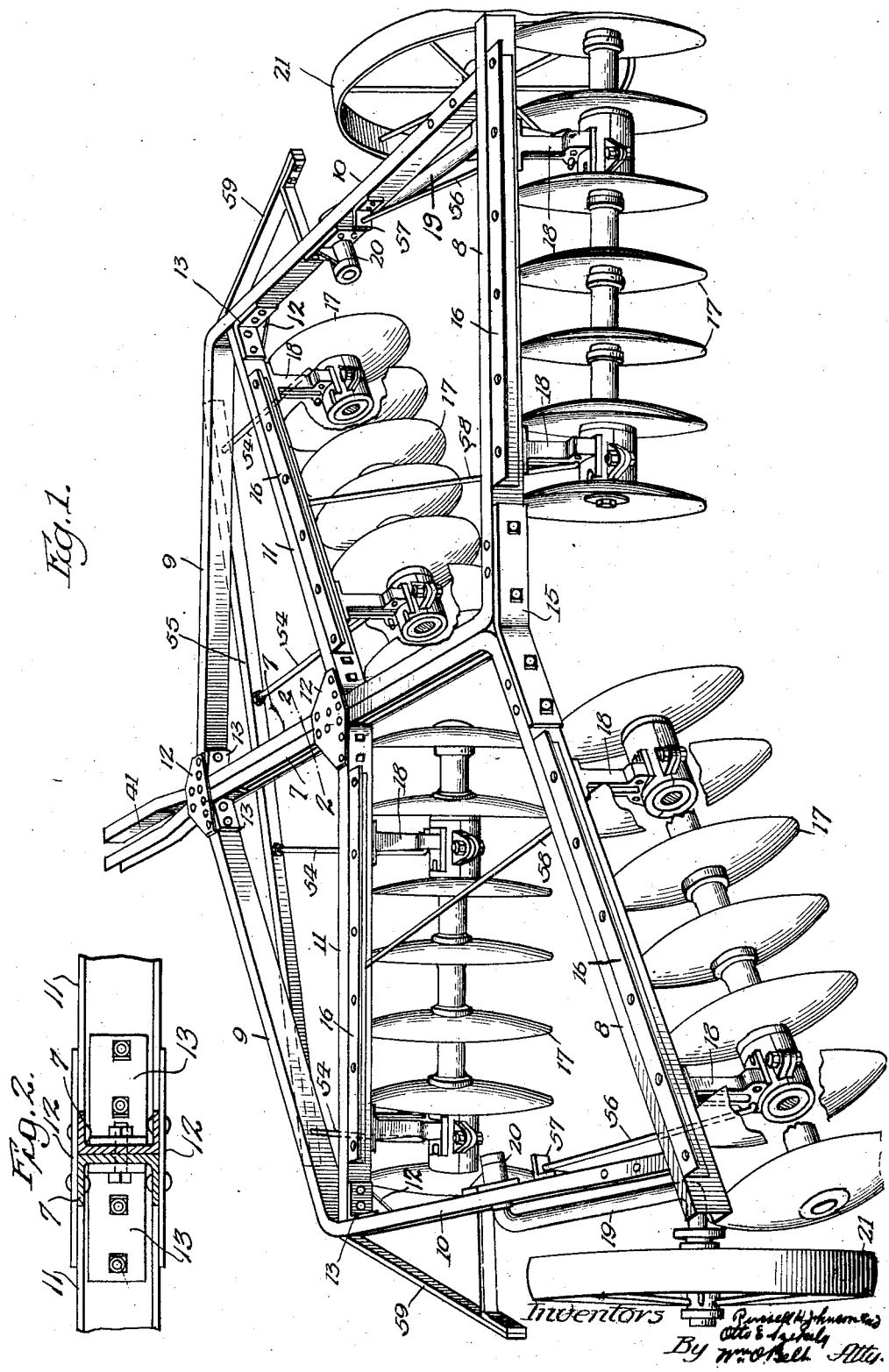

Patented Nov. 10, 1931

1,830,761

UNITED STATES PATENT OFFICE

RUSSELL H. JOHNSON AND OTTO E. SZEKELY, OF HOLLAND, MICHIGAN, ASSIGNORS TO BROWN LYNCH SCOTT CO., OF MONMOUTH, ILLINOIS, A CORPORATION OF ILLINOIS

WHEELED HARROW

Original application filed August 30, 1926, Serial No. 132,396. Divided and this application filed December 13, 1928. Serial No. 325,822.

This invention relates to wheeled harrows and the application is a division of our application Serial Number 132,396 filed August 30, 1926.

The object of the invention is to provide a strong, substantial and rigid frame, light in weight and simple in construction, adapted to carry disk gangs, and mounted on wheels and provided with adjustments whereby the frame may be easily raised and lowered as required for regulating the depth of cut and for transportation purposes.

In the accompanying drawings we have shown the invention in a selected embodiment and referring thereto, Fig. 1 is a perspective view of a harrow showing our improved frame.

Fig. 2 is a detail sectional view on the line 2—2 of Fig. 1.

Referring to the drawings the frame comprises two L-shaped members each having a forwardly extending bar 7 and a laterally extending bar 8. The two bars 7, 7 are arranged side by side centrally of the frame, and the two bars 8, 8 are located at the back of the frame and extend laterally from the rear ends of the bars 7, 7 and are inclined rearwardly. Each pair of bars 7, 8 constitutes a substantially L-shaped draft member and each pair of bars 9, 10 constitutes a substantially L-shaped brace or outside member, the front bars 9, 9 being rigidly connected at their ends to the bars 7, 7 and the side bars 10, 10 being rigidly connected at their ends to the rear bars 8, 8. The front bars 9, 9 are rearwardly inclined and are substantially parallel with the rear bars 8, 8; the side bars 10, 10 are substantially parallel with the center bars 7, 7. We prefer to make the bars 7, 8 and also the bars 9, 10 out of single pieces of channel iron. Each set of bars 7, 8; 9, 10 provides a substantially rectangular frame section and the two sections are rigidly secured together at the center bars to form the frame of the harrow. Cross bars 11, 11 are rigidly connected at their inner ends to the center bars 7, 7 substantially midway of their length, and the outer ends of the cross bars are connected to the side bars 10, 10 adjacent their front ends so that the cross bars incline forwardly from the center bars. We provide top and bottom gussets 12 at the juncture of the front bars 9, 9 with the center bars 7, 7 and at the juncture of the cross bars 11, 11 with the center bars 7, 7 and bottom gussets 12 at the juncture of the side bars 10, 10 with the rear bars 8, 8 and with the cross bars 11, 11. We also provide angle plates 13 at the juncture of the front bars 9, 9 and the cross bars 11, 11 with the center bars 7, 7 and at the juncture of the cross bars 11, 11 with the side bars 10, 10. The ends of the side bars 10, 10 are rigidly fastened to the ends of the rear bars 8, 8 by angle bars 14. The cross bars are also preferably made of channel iron, like the frame bars. A plate 15 overlaps the inner ends of the rear bars 8, 8 and is rigidly fastened thereto. Angle bars 16 are fastened to the rear bars 8, 8 and to the cross bars 11, 11 from which scrapers may be suspended. The disk gangs 17 are supported in brackets 18 depending from the bars 8, 8. Arms 19 are arranged alongside and on the outside of the side bars 10, 10, the forward ends of these arms being bent laterally and inwardly and pivoted in bearings at 20 on the side bars, and the rear ends of the arms are bent laterally and outwardly to form axles upon which the carrying wheels 21 are mounted. Tie rods 54 may be connected to the front gangs and to an anchor bar 55 which is fastened to the front bars 9, 9; tie rods 56 may be connected to the outer ends of the rear gangs and to brackets 57 on the side bars 10, 10; and tie rods 58 may be connected to the inner ends of the rear gangs and to the cross bars 11, 11. These tie rods cooperate with the brackets to hold the gangs in rigid position on the frame. To protect the wheels 21 we may provide side guards 59 on the sides of the frame.

The harrow herein described is of the rigid type covered by the Flatley Patent No. 1,531,278, patented March 31, 1925, and it has been carefully designed for strength, for lightness and for effective operation in practical use. The whole frame and the disk gangs constitute a single unit adjustable vertically relative to the carrying wheels and by suitable means set forth in our original application.

We have shown and described the harrow in a preferred embodiment which has been found satisfactory in practical use, but it may be desirable to change the construction and arrangement of parts to meet different conditions and we reserve the right to make all such changes as fairly fall within the scope of the following claims.

We claim:

1. A rigid frame for wheeled harrows comprising two complete and independent sections, each section comprising a one-piece L-shaped brace member and a one-piece L-shaped draft member, the draft member comprising a forwardly extending center bar and an outwardly projecting rearwardly inclined integral rear bar, and the brace member comprising a front bar connected to the center bar and a side bar connected to the rear bar, a cross bar having the ends thereof rigidly connected to said center bar and said side bar, the center bars being connected together side by side to connect the sections together and the center bars being adapted to be connected at their front ends with draft means.

2. A rigid frame for wheeled harrows comprising two one-piece L-shaped draft members having forwardly extending center bars and laterally extending rearwardly inclined integral rear bars, cross bars having the ends thereof abutting said center bars, gussets for connecting the ends of said cross bars to said center bars, said center bars being connected together side by side, and a plate over-lapping the juncture of the two members at the rear end thereof and connected to the rear bars.

3. A rigid frame for wheeled harrows comprising two L-shaped brace members each having a center bar and an integral rear bar projecting outwardly from the rear end of the center bar, and a brace member having a front bar connected at one end to the center bar and an integral side bar connected at one end to the rear bar, cross bars connected to the center bars and to the brace members, and gussets fastened to the center bars and the adjacent ends of the front bars and cross bars.

RUSSELL H. JOHNSON.
OTTO E. SZEKELY.